United States Patent
Chen

(10) Patent No.: US 12,211,515 B2
(45) Date of Patent: Jan. 28, 2025

(54) VOICE WAKEUP METHOD AND SYSTEM, AND DEVICE

(71) Applicant: Huawei Technologies Co., Ltd., Shenzhen (CN)

(72) Inventor: Xiang Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 272 days.

(21) Appl. No.: 17/789,959

(22) PCT Filed: Dec. 23, 2020

(86) PCT No.: PCT/CN2020/138677
§ 371 (c)(1),
(2) Date: Jun. 29, 2022

(87) PCT Pub. No.: WO2021/136037
PCT Pub. Date: Jul. 8, 2021

(65) Prior Publication Data
US 2022/0392481 A1 Dec. 8, 2022

(30) Foreign Application Priority Data
Dec. 31, 2019 (CN) .......................... 201911409578.1

(51) Int. Cl.
G10L 25/21 (2013.01)
G10L 15/22 (2006.01)
G10L 21/0216 (2013.01)

(52) U.S. Cl.
CPC .............. *G10L 25/21* (2013.01); *G10L 15/22* (2013.01); *G10L 21/0216* (2013.01); *G10L 2015/223* (2013.01)

(58) Field of Classification Search
CPC ..... G10L 25/21; G10L 15/22; G10L 21/0216; G10L 2015/223; G10L 25/51
See application file for complete search history.

(56) References Cited

U.S. PATENT DOCUMENTS 10,366,699 B1 * 7/2019 Dharia .................... G10L 25/21
10,482,904 B1 * 11/2019 Hardie .................... G10L 15/20
(Continued)

FOREIGN PATENT DOCUMENTS

CN 102819009 A 12/2012
CN 106503448 A 3/2017
(Continued)

OTHER PUBLICATIONS

Stefanovic, I., et al., "Implementation of the wake word for smart home automation system," 2017 IEEE 7th International Conference on Consumer Electronics—Berlin (ICCE—Berlin), Berlin, Germany, 2017, pp. 271-272.

*Primary Examiner* — Douglas Godbold
(74) *Attorney, Agent, or Firm* — Conley Rose, P.C.

(57) ABSTRACT

A voice wakeup method includes receiving a plurality of voice wakeup messages sent by a plurality of electronic devices, where each voice wakeup message includes a distance and a wakeup energy value; determining, based on distances and wakeup energy values in the plurality of voice wakeup messages from the plurality of electronic devices, whether energy attenuation of the wakeup word emitted by the sound source complies with an attenuation law of sound energy radiated by a point source; and when determining that the energy attenuation of the wakeup word emitted by the sound source does not comply with the attenuation law of the sound energy radiated by the point source, sending a wakeup forbidding instruction to the plurality of electronic devices.

20 Claims, 9 Drawing Sheets

(56) References Cited

U.S. PATENT DOCUMENTS

| | | | | |
|---|---|---|---|---|
| 10,536,287 | B1* | 1/2020 | Leblang | G10L 15/22 |
| 10,536,288 | B1* | 1/2020 | Leblang | H04M 3/563 |
| 10,616,726 | B1* | 4/2020 | Freeman, II | H04W 8/02 |
| 10,685,669 | B1* | 6/2020 | Lan | G10L 25/51 |
| 11,069,364 | B1* | 7/2021 | Souza | H04R 5/04 |
| 2015/0230075 | A1 | 8/2015 | Reunamaki et al. | |
| 2015/0370531 | A1* | 12/2015 | Faaborg | G06F 3/167 |
| | | | | 704/275 |
| 2017/0076720 | A1* | 3/2017 | Gopalan | G10L 15/22 |
| 2017/0083285 | A1* | 3/2017 | Meyers | G10L 15/222 |
| 2018/0130468 | A1* | 5/2018 | Pogue | G10L 15/22 |
| 2019/0051299 | A1* | 2/2019 | Ossowski | G10L 15/22 |
| 2019/0066670 | A1* | 2/2019 | White | G10L 15/22 |
| 2019/0147904 | A1 | 5/2019 | Tao et al. | |
| 2019/0164552 | A1 | 5/2019 | Lim et al. | |
| 2019/0311719 | A1* | 10/2019 | Adams | G10L 15/30 |
| 2019/0311720 | A1* | 10/2019 | Pasko | G06F 3/167 |
| 2019/0341049 | A1* | 11/2019 | Cheng | G06F 1/3206 |
| 2019/0362719 | A1* | 11/2019 | Gruenstein | G06F 3/167 |
| 2020/0090646 | A1* | 3/2020 | Smith | G10L 15/22 |
| 2022/0223150 | A1 | 7/2022 | Li et al. | |
| 2022/0366906 | A1* | 11/2022 | Wu | H04L 12/12 |
| 2022/0392481 | A1 | 12/2022 | Chen et al. | |
| 2023/0393811 | A1* | 12/2023 | Piersol | G10L 15/30 |

FOREIGN PATENT DOCUMENTS

| | | |
|---|---|---|
| CN | 107577449 A | 1/2018 |
| CN | 107919119 A | 4/2018 |
| CN | 108320742 A | 7/2018 |
| CN | 108337601 A | 7/2018 |
| CN | 108831451 A | 11/2018 |
| CN | 109065060 A | 12/2018 |
| CN | 109215663 A | 1/2019 |
| CN | 109391528 A | 2/2019 |
| CN | 110223684 A | 9/2019 |
| CN | 110265006 A | 9/2019 |
| CN | 110288997 A | 9/2019 |
| CN | 111091828 A | 5/2020 |
| KR | 20190064270 A | 6/2019 |
| TW | I669710 B | 8/2019 |
| WO | 2019046026 A1 | 3/2019 |

* cited by examiner

VOICE WAKEUP METHOD AND SYSTEM, AND DEVICE

CROSS-REFERENCE TO RELATED APPLICATIONS

This is a U.S. National Stage of International Patent Application No. PCT/CN2020/138677 filed on Dec. 23, 2020, which claims priority to Chinese Patent Application No. 201911409578.1 filed on Dec. 31, 2019. Both of the aforementioned applications are hereby incorporated by reference in their entireties.

TECHNICAL FIELD

This application relates to a voice wakeup method and system, and a device.

BACKGROUND

With emergence of an internet of things, smart household has gained popularity to a specific extent, and smart household products, typically represented by voice interaction products, are increasingly widely involved in daily life.

Currently, most voice interaction products such as a smart sound box pursue a high wakeup rate. To achieve a high wakeup rate, wakeup sensitivity of a device usually needs to be improved. However, higher wakeup sensitivity of a device indicates a higher possibility of triggering more unintentional wakeups. For example, when a user chats with others or watches television, a nearby smart sound box may be unintentionally woken up when the user utters a word similar to a wakeup word or a word similar to a wakeup word is broadcast on television.

SUMMARY

This application is intended to provide a voice wakeup method and system, and a device, to reduce an unintentional wakeup rate of a device.

According to a first aspect of this application, a voice wakeup method is provided. The method may include: A cloud server, one of a plurality of electronic devices, or a third-party device receives a plurality of voice wakeup messages sent by the plurality of electronic devices, where each voice wakeup message includes a distance and a wakeup energy value, the distance represents a distance between an electronic device that sends the voice wakeup message and a sound source, and the wakeup energy value represents an energy value of a wakeup word that is emitted by the sound source and that is received by the electronic device that sends the voice wakeup message; determining, based on distances and wakeup energy values in the plurality of voice wakeup messages from the plurality of electronic devices, whether energy attenuation of the wakeup word emitted by the sound source complies with an attenuation law of sound energy radiated by a point source; and when determining that the energy attenuation of the wakeup word emitted by the sound source does not comply with the attenuation law of the sound energy radiated by the point source, sending a wakeup forbidding instruction to the plurality of electronic devices.

In the solution provided in this application, an intentional wakeup caused by non-point source noise is determined by using the attenuation law of the sound energy radiated by the point source, to reduce an unintentional wakeup rate of a rate.

Further, the determining, based on distances and wakeup energy values in the plurality of voice wakeup messages from the plurality of electronic devices, whether energy attenuation of the wakeup word emitted by the sound source complies with an attenuation law of sound energy radiated by a point source may include: calculating an attenuation mapping value of each of the plurality of electronic devices, where the attenuation mapping value is negatively correlated with the distance and positively correlated with the wakeup energy value and an attenuation coefficient, and the attenuation coefficient is used to represent a correspondence between the sound energy radiated by the point source and a distance from the point source; separately calculating differences between attenuation mapping values of the plurality of electronic devices, and determining, based on the calculated differences, whether the energy attenuation of the wakeup word emitted by the sound source complies with the attenuation law of the sound energy radiated by the point source; and when there is a predetermined proportion of electronic devices whose difference between the attenuation mapping values is less than a difference threshold in the plurality of electronic devices, determining that the energy attenuation of the wakeup word emitted by the sound source complies with the attenuation law of the sound energy radiated by the point source.

In an implementation, the attenuation mapping value may be calculated by using the following formula:

$$\text{attenuation coefficient} \times \frac{\text{wakeup energy value}}{\text{distance}}.$$

In another implementation, the attenuation mapping value may be calculated by using the following formula:

$$\text{attenuation coefficient} \times \frac{\text{wakeup energy value} - \text{ambient sound energy value}}{\text{distance}},$$

where the ambient sound energy value represents an energy value of an ambient sound collected by the electronic device. The ambient sound energy value is introduced in calculating the attenuation mapping value to reduce impact of the ambient sound energy value on the energy value of the wakeup word in a noise scenario, so as to reduce impact on accuracy of the attenuation mapping value S. In addition, the ambient sound energy value may be included in the voice wakeup message.

In still another implementation, the attenuation mapping value may be calculated by using the following formula:

$$\text{attenuation coefficient} \times \text{device type factor} \times \frac{\text{wakeup energy value} - \text{ambient sound energy value}}{\text{distance}},$$

where the device type factor is used to represent a difference between the electronic devices. The device type factor μ is added in calculating the attenuation mapping value of each electronic device, to eliminate or reduce impact caused by a hardware difference and/or an algorithm difference between different devices.

Further, the plurality of electronic devices may be located in a same group, and electronic devices located in the same group are managed by a same account.

Further, the receiving a plurality of voice wakeup messages sent by the plurality of electronic devices may include: receiving a voice wakeup request sent by a first electronic device in the plurality of electronic devices, starting timing of a predetermined time period, and receiving, in a timing period, a voice wakeup message sent by an electronic device other than the first electronic device in a group in which the plurality of electronic devices are located. In addition, after a quantity of received voice wakeup messages reaches a preset receiving quantity threshold, timing may be ended in advance, to reduce a time for waiting to collect the voice wakeup message.

In this application, whether there is an unintentional wakeup is determined by using the voice wakeup messages reported by the plurality of electronic devices, and whether the attenuation mapping values of the devices are basically equal is calculated by using relative information between the plurality of devices, to determine an unintentional wakeup caused by non-point source noise. In this way, an unintentional wakeup rate can be effectively reduced, and user experience can be improved. In addition, the solution provided in this embodiment of this application has low complexity, can be implemented by using existing data, and does not require addition of new hardware or a new complex algorithm for calculation.

According to a second aspect of this application, a voice wakeup method is provided. The method may include: A cloud server, one of at least one electronic device, or a third-party device receives at least one voice wakeup message sent by the at least one electronic device, where each voice wakeup message includes a distance and a wakeup energy value, the distance represents a distance between an electronic device that sends the voice wakeup message and a sound source, and the wakeup energy value represents an energy value of a wakeup word that is emitted by the sound source and that is received by the electronic device that sends the voice wakeup message; determines, based on the at least one received voice wakeup message, whether the sound source is an electronic device in the at least one electronic device; and when the sound source is an electronic device in the at least one electronic device, sends a wakeup forbidding instruction to the at least one electronic device that sends the voice wakeup message.

Further, the determining, based on the at least one received voice wakeup message, whether the sound source is an electronic device in the at least one electronic device may include: determining, based on a distance in the at least one voice wakeup message, whether there is an electronic device whose distance from the sound source is less than a distance threshold in the at least one electronic device; and when there is an electronic device whose distance from the sound source is less than the distance threshold, determining that the sound source is an electronic device in the at least one electronic device.

Further, if a first voice wakeup message in the at least one voice wakeup message includes a first identifier, it is determined that the sound source is an electronic device in the at least one electronic device. The first voice wakeup message is any voice wakeup message in the at least one voice wakeup message, an electronic device that sends the first voice wakeup message is a first electronic device, and the first identifier is used to indicate that a wakeup word received by the first electronic device is from the first electronic device.

Further, the at least one electronic device may be a plurality of electronic devices. In addition, the method may further include: when the sound source is not an electronic device in the at least one electronic device, performing the method provided in any one of the first aspect or the implementations of the first aspect of this application.

Further, the at least one electronic device may be located in a same group, and electronic devices located in the same group are managed by a same account.

In this application, whether there is an unintentional wakeup is determined by using voice wakeup messages reported by the plurality of electronic devices, and whether the sound source is a device in a group is determined, to determine whether it is an unintentional wakeup. In this way, an unintentional wakeup rate can be effectively reduced, and the solution has relatively low complexity.

According to a third aspect of this application, a voice wakeup system is provided, and includes a plurality of electronic devices and a cloud server. Each electronic device is configured to: pick up a sound, and send a voice wakeup message to the cloud server when the picked-up sound includes a wakeup word, where the voice wakeup message includes a distance and a wakeup energy value, the distance represents a distance between the electronic device and a sound source, and the wakeup energy value represents an energy value of a wakeup word that is emitted by the sound source and that is received by the electronic device. The cloud server is configured to: receive voice wakeup messages sent by the plurality of electronic devices, and perform the method provided in any one of the first aspect or the implementations of the first aspect of this application.

According to a fourth aspect of this application, a voice wakeup system is provided, and includes at least one electronic device and a cloud server. Each electronic device is configured to: pick up a sound, and send a voice wakeup message to the cloud server when the picked-up sound includes a wakeup word, where the voice wakeup message includes a distance and a wakeup energy value, the distance represents a distance between the electronic device and a sound source, and the wakeup energy value represents an energy value of a wakeup word that is emitted by the sound source and that is received by the electronic device. The cloud server is configured to: receive at least one voice wakeup message sent by the at least one electronic device, and perform the method provided in any one of the second aspect or the implementations of the second aspect of this application.

Further, in the systems provided in the third aspect and the fourth aspect, the cloud server in the system may be replaced with another third-party device, and the third-party device performs the method originally performed by the cloud server. Alternatively, the system may not include the cloud server, and one of the electronic devices performs the method originally performed by the cloud server.

According to a fifth aspect of this application, a device is included. The device includes a processor, a memory, and a transceiver. The processor is separately coupled to the memory and the transceiver. The transceiver is configured to: receive and send a signal. The memory stores the instructions, and the processor is configured to: read and execute the instructions in the memory, so that the device performs the method provided in any one of the first aspect, the second aspect, the implementations of the first aspect, or the implementations of the second aspect.

According to a sixth aspect of this application, a machine readable medium is provided. The machine readable medium stores instructions. When the instructions are run by a machine, the machine performs the method provided in any one of the first aspect, the second aspect, the implementations of the first aspect, or the implementations of the second aspect.

According to a seventh aspect of this application, a computer program product is provided. The computer program product includes program code, and when the computer program product is executed by a controller, the controller performs the method provided in any one of the first aspect, the second aspect, the implementations of the first aspect, or the implementations of the second aspect. The computer program product may be a software installation package, and when the method provided in any one of the first aspect, the second aspect, the implementations of the first aspect, or the implementations of the second aspect needs to be used, the computer program product may be downloaded to the controller, and the computer program product may be run on the controller.

According to an eighth aspect of this application, an apparatus is provided. The apparatus has a function of implementing the method provided in any one of the first aspect, the second aspect, the implementations of the first aspect, or the implementations of the second aspect. The function may be implemented by hardware, or may be implemented by hardware executing corresponding software. The hardware or the software includes one or more modules corresponding to the foregoing function.

DESCRIPTION OF EMBODIMENTS

It should be understood that although terms such as "first" and "second" may be used herein to describe various features, these features should not be limited by these terms. These terms are merely used for distinction, and shall not be understood as an indication or implication of relative importance. For example, without departing from the scope of the example embodiments, a first feature may be referred to as a second feature, and similarly the second feature may be referred to as the first feature.

Unless otherwise stated, terms "comprise", "have", and "include" are synonymous. The phrase "A/B" means "A or B". The phrase "A and/or B" means "(A), (B), or (A and B)".

As used herein, the term "module" may refer to being a part thereof, or include a memory (a shared memory, a dedicated memory, or a group memory) for running one or more software or firmware programs, an application-specific integrated circuit (ASIC), an electronic circuit and/or a processor (a shared processor, a dedicated processor, or a group processor), a combined logic circuit, and/or another appropriate component that provides the function.

To make the objectives, technical solutions, and advantages of this application clearer, the following further describes the implementations of this application in detail with reference to the accompanying drawings.

Figure 1:
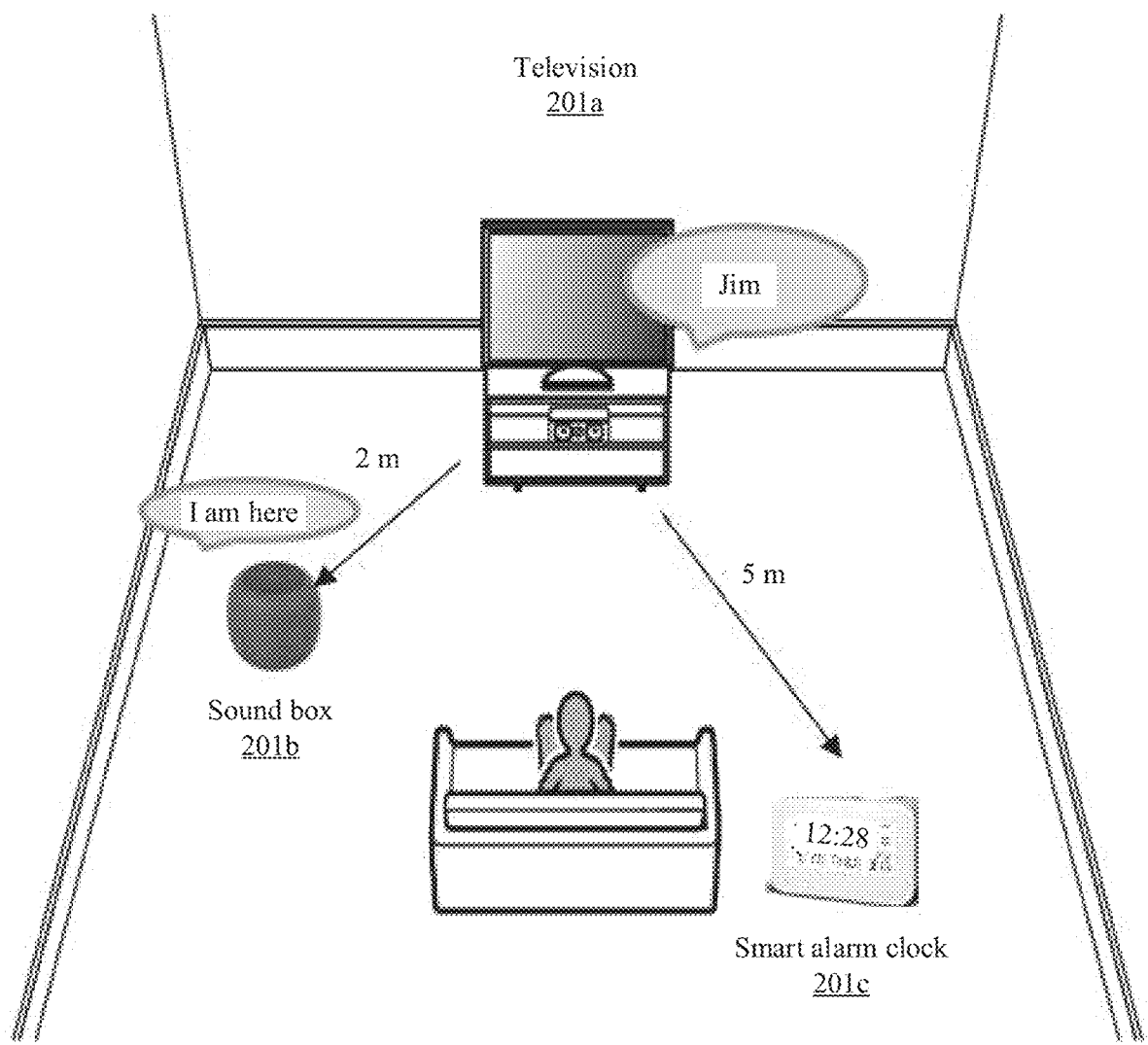
FIG. 1 is an example of a scenario that includes a plurality of electronic devices according to an embodiment of this application.

As smart household is increasingly popular, a scenario in which a plurality of intelligent devices appear in specific space becomes very common. According to some embodiments of this application, FIG. 1 shows an example of a scenario that includes a plurality of electronic devices. In the scenario shown in FIG. 1, specific electronic devices include a sound box 201b, a television 201a, and a smart alarm clock 201c. It should be noted that the scenario shown in FIG. 1 is merely used to illustrate a multi-device scenario, and is not intended to limit this application. In various implementation scenarios, different from those shown in the figure, another quantity and/or another different type of devices may be included. For example, more or fewer devices may be included, or another device different from the three devices shown in FIG. 1 is included.

According to some embodiments of this application, the television 201a may be a smart television that can interact with a cloud or another device through a network. For example, the television 201a may include a high-speed processor and a storage device, respectively configured to run and store an application. In addition, the television 201a may be provided with an operating system, so that when enjoying ordinary television content, a user can independently install and uninstall various types of application software to continuously expand and upgrade functions. For example, the television 201a may include a plurality of interactive applications such as a man-machine interaction application, a multi-screen interaction application, and a content sharing application. It should be noted that the television in the embodiments of this application may be the foregoing smart television, or may be a smart screen with a large screen, and may not support a function of a common television. The sound box 201b may be a smart sound box, so that the user can access the Internet through voice, for example, play a song on demand, shop on the Internet, or learn about weather and information, or the user can control other smart household devices, for example, switch on or off a curtain or a lamp, manage another electrical appliance, and warm a water heater in advance. The smart alarm clock 201c may provide functions that are of displaying time and sending an audio signal or another signal at a predetermined moment and that are similar to those of a common alarm clock, and may also have a function similar to that of the sound box 201b. For example, the user can access the Internet through voice or the user can control another smart household device.

According to some embodiments of this application, voice products such as the television 201a, the sound box 201b, and the smart alarm clock 201c may be woken up through voice and perform voice interaction with the user.

According to some embodiments of this application, voice interaction may be considered as a voice input-based interaction manner, and a feedback result of a device may be obtained if the user speaks.

According to some embodiments of this application, a voice interaction procedure may be divided into five phases: wakeup, response, input, understanding, and feedback. Wakeup may be considered as a first touch point each time a user interacts with a voice product. The user may wake up a device by using a specific wakeup word. The wakeup word may be considered as a word that defines switching of the product from a standby state to a working state. The wakeup word may be preset by the user in the electronic device based on a requirement of the user, or may be preset before the electronic device is delivered. A manner of setting the wakeup word is not limited in the embodiments of this application.

It should be noted that in the embodiments of this application, any user or a specific user may wake up the electronic device. For example, the specific user may be a user who pre-stores a sound for emitting the wakeup word in the electronic device, for example, an owner of each electronic device in the scenario shown in FIG. 1.

According to some embodiments of this application, voice products such as the television 201a, the sound box 201b, and the smart alarm clock 201c may be coupled into a group by using a network. For example, the sound box 201b, the television 201a, and the smart alarm clock 201c may log in to a same account, and one of the sound box 201b, the television 201a, and the smart alarm clock 201c or a cloud server may serve as a control center, to implement collaborative control of the sound box 201b, the television 201a, and the smart alarm clock 201c. For example, when a voice signal that includes a specific wakeup word is received, whether to wake up a device and a device to be woken up in a group may be determined by using various pieces of wakeup information such as a magnitude of an energy value of the wakeup word received by each device. For example, in some embodiments, if a voice of the user includes a specific wakeup word such as "Jim", the smart alarm clock 201c that is a device closest to the user may be woken up and respond to the user, or each of the three devices makes a response. In another embodiment, a different wakeup response rule may be set. For example, different wakeup response priorities may be set for different devices.

According to some embodiments of this application, when the user watches television, in a process of playing a program by the television 201a, a played sound may include a specific wakeup word or a word similar to a wakeup word, for example, "Jim" shown in FIG. 1 or "Jimmy". In this case, the sound box 201b captures the wakeup word, is woken up, and makes a voice reply. For example, in FIG. 1, the sound box replies with "I am here". Such unintentional wakeup disturbs the user who is watching television.

Such a wakeup caused by a non-intended sound may be considered as an unintentional wakeup. To reduce an unintentional wakeup probability, a voice wakeup technology is provided according to some embodiments of this application. In this technology, whether a wakeup word is emitted by a device in a group may be determined, and wakeup is forbidden when the wakeup word is emitted by the device in the group, or whether a sound source that emits a wakeup word is a point source is determined, and wakeup is forbidden when the sound source that emits the wakeup word is a point source, to reduce occurrence of an unintentional wakeup described above.

Figure 2:
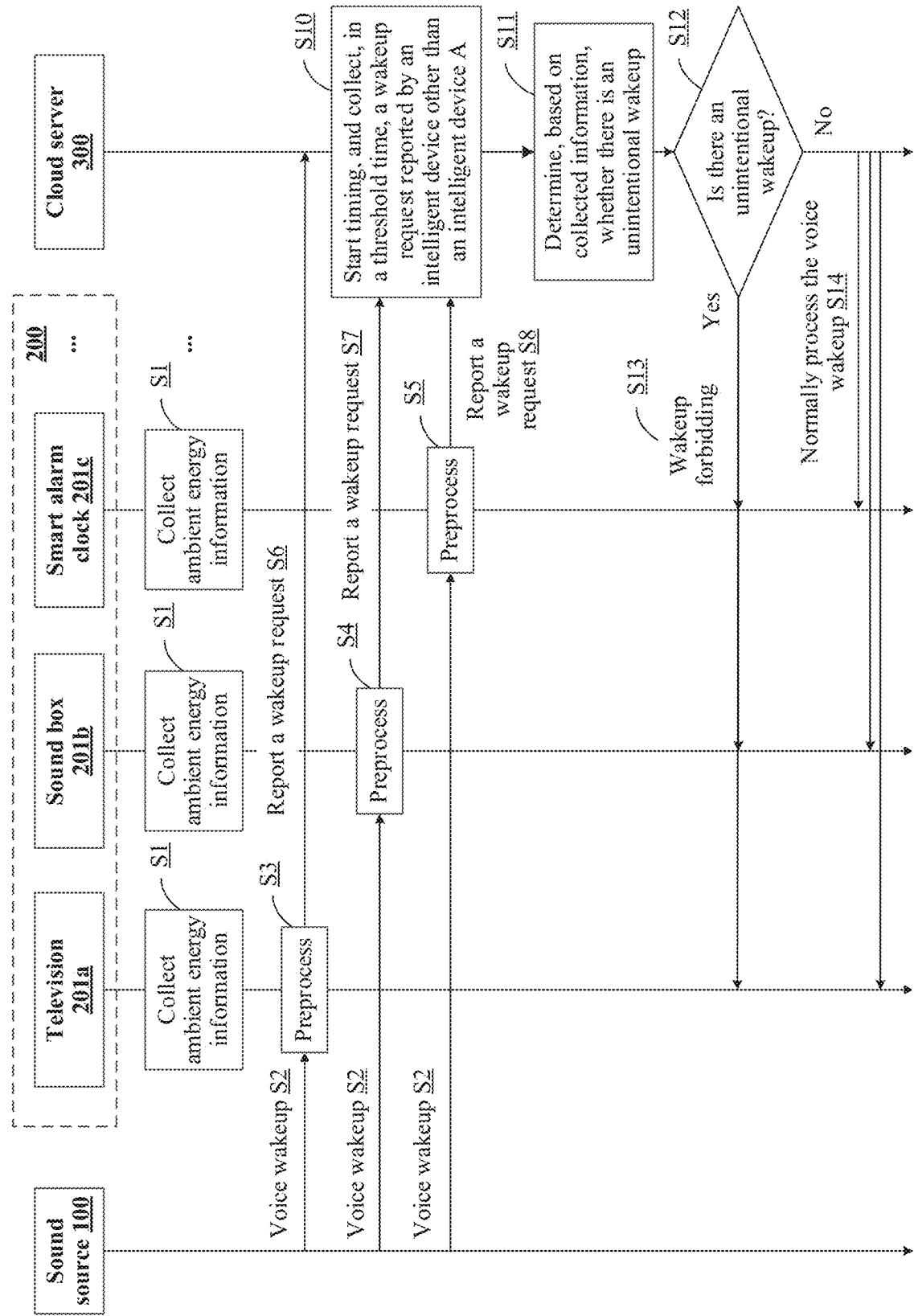
FIG. 2 is a flowchart of a voice wakeup method according to an embodiment of this application.

FIG. 2 shows a voice wakeup process according to an embodiment of this application. In FIG. 2 and the remaining figures, a letter following a reference numeral, for example, "201a" represents a reference to an element with the specific reference numeral. In the text, a reference numeral that is not followed by a letter, for example, "201", represents a general reference to an implementation of an element with the reference numeral.

Specifically, as shown in FIG. 2, a plurality of electronic devices 201 (for example, a television 201a, a sound box 201b, and a smart alarm clock 201c shown in the figure) may form an electronic device group 200. The electronic devices 201 may interact with a cloud server 300 through a network and may be uniformly managed by the cloud server 300. A manner in which a plurality of electronic devices form an electronic device group may be, for example, the forgoing manner in which a plurality of devices log in to a same account.

The electronic device 201 may be various electronic devices with a receiving apparatus such as a microphone, for example, various smart household devices (for example, the television 201a, the sound box 201b, and the smart alarm clock 201c shown in FIG. 1, various lamps, displays, and cameras), a mobile phone, a tablet computer, a desktop computer, a laptop computer, a vehicle-mounted terminal, an intelligent voice terminal artificial intelligence (artificial intelligence, AI), a wearable device, an augmented reality (augmented reality. AR) device, and a virtual reality (virtual reality, VR) device. An example embodiment of an electronic device 201 includes but is not limited to an electronic device using iOS, Android, Microsoft, or another operating system. A specific structural example of the electronic device 201 may be described in detail below with reference to FIG. 7.

The electronic device 201 may interact with the cloud server 300 or another device through a network. In various implementations, the network may be a wired network or a wireless network, and may have many different configurations. The network may include various interconnected data paths such as a local area network (LAN) and a wide area network (WAN) (for example, the Internet). The network may be alternatively coupled to or include a part of a telecommunications network, and is used to send data by using various different communications protocols. In some implementations, the network may include a Bluetooth communications network, Wi-Fi, or a cellular communications network, or the like, for sending and receiving data.

According to some embodiments of this application, the cloud server 300 may be a hardware server. According to other embodiments of this application, the cloud server 300 may be alternatively implanted into a virtualization environment. For example, the cloud server 300 may be a virtual machine executed on a hardware server that may include one or more other virtual machines. In some implementations, the cloud server 300 may send data to the electronic device 201 and receive data from the electronic device 201 through the network.

In some implementations, the cloud server 300 may include a related program for processing a voice wakeup, and may further include a database used to store a message exchanged by the cloud server 300 and data and/or a configuration related to the electronic device 201. In some implementations, all or some of related programs and databases may be implemented on the electronic device 201.

A voice wakeup process according to an embodiment of this application is described below with reference to FIG. 2.

According to some embodiments of this application, as shown in FIG. 2, S1: Each electronic device 201 may collect ambient energy information in real time or based on a fixed period. There may be a plurality of electronic devices 201, for example, a television 201a, a sound box 201b, and a smart alarm clock 201c, and there may be more electronic devices. The collected ambient energy information may be locally stored in the electronic device, and may be reported to a cloud server 30) in response to an instruction of the cloud server, and may be reported to the cloud server 300 when the electronic device reports other information, or reported to the cloud server 300 in a preset period. When the collected ambient energy information is reported to the cloud server 300, the collected ambient energy information may be directly reported, or the collected ambient energy information may be reported to the cloud server 300 after some processing is performed. According to some embodiments of this application, the ambient energy information may indicate an energy value of an ambient sound. The ambient energy information may be an energy value of an ambient sound, or may include information indicating an energy value of an ambient sound.

S2: After a sound source 100 emits a sound, the sound is picked up by a plurality of electronic devices 201 near the sound source. For example, in the example shown in FIG. 2, the sound may be picked up by the television 201a, the sound box 201b, and the smart alarm clock 201c.

S3-S5: The television 201a, the sound box 201b, and the smart alarm clock 201c that pick up the sound may separately preprocess the picked-up sound. The preprocessing may include but is not limited to performing speech recognition, and determining whether the picked-up voice includes a wakeup word. If the sound includes the wakeup word (for example, "Jim" described above) or a word with an excessively high similarity to the wakeup word, it is considered that the picked-up sound is a wakeup voice. In this case, wakeup energy information is obtained based on the picked-up sound, and whether an energy value E of the wakeup word is greater than a wakeup threshold $E_{th}$ is determined based on the wakeup energy information. According to some embodiments of this application, the wakeup energy information may indicate the energy value of the wakeup word. The wakeup energy information may be the energy value of the wakeup word, or may be information used to indicate the energy value of the wakeup word.

S6-S8: When the energy value E of the wakeup word is greater than the wakeup threshold $E_{th}$, each of the television 201a, the sound box 201b, and the smart alarm clock 201c that receive the wakeup voice may report a voice wakeup message to the cloud server 300. The voice wakeup message sent by each electronic device may include distance information and the wakeup energy information. The distance information may be information indicating a distance between the electronic device and the sound source, and the wakeup energy information may be information indicating the energy value of the wakeup word in the received wakeup voice.

According to some embodiments of this application, the distance information may be obtained by using a sound source localization algorithm of a microphone array, for example, a beamforming-based method, a high resolution spectral estimation-based method, or a time difference of arrival (TDOA)-based method.

The microphone array is a set of microphone sensors placed at different spatial positions in a specific manner to receive sound signals spatially. After a specific processing process is performed, related feature information of the received signal, for example, amplitude, frequency, and a direction, may be extracted. Based on different spatial distributions of microphone sensors, the microphone array may have the following topologies: a linear array, a circular array, a spherical array, and the like. Strictly, the microphone array may be a line array, cross-shaped array, a planar array, a helical array, a spherical array, an irregular array, or the like. A quantity of array elements of the microphone array, namely, a quantity of microphones, may range from 2 to thousands.

In a sound source localization system, beamforming is mainly used in a sound source enhancement module, and a direction of a beam used for the array to respond to a sound in a different direction is changed by adjusting a coefficient of the microphone array. For example, the beam may be obtained by performing weighted summation on outputs of all array elements, a weight is adjusted to maximize output power of the beam, and power is searched for, to obtain a point with maximum power, namely, a direction of the sound source. A high resolution spectral estimation-based sound source localization technology is based on a high resolution spectral estimation algorithm, including an autoregressive AR model, minimum variance spectral estimation (MV), and an eigenvalue decomposition (for example, a Music algorithm) method. In all these methods, a correlation matrix of a spatial spectrum is calculated by obtaining a signal of a microphone array. A time difference of arrival (TDOA)-based localization method is usually performed in two steps: A time difference of arrival is first estimated and a time difference of arrival TDOA between array elements in a microphone array is obtained; and then a position of the sound source is determined by using the obtained time difference of arrival and with reference to a known spatial position of the microphone array.

It is assumed that the television 201a first reports a voice wakeup message (S6). After receiving the first voice wakeup message, the cloud server 300 performs S10 of starting timing and collecting, in a threshold time, a voice wakeup message reported by another electronic device 201 in a group 200 in which the television 201a is located.

S11: After collecting, in the threshold time, voice wakeup messages reported by the sound box 201b and the smart alarm clock 201c, the cloud server 300 determines, based on collected information, whether there is an unintentional wakeup. A method for determining whether there is an unintentional wakeup is described in detail below with reference to FIG. 3.

S12: Determine, based on a result of determining whether there is an unintentional wakeup in S11, whether the current voice wakeup is an unintentional wakeup.

S13 of sending a wakeup forbidding instruction to each of the television 201a, the sound box 201b, and the smart alarm clock 201c that receive the wakeup voice is performed when an unintentional wakeup is determined in S12.

S14 of normally processing a voice wakeup is performed when it is determined in S12 that this is not an unintentional wakeup. Different wakeup response rules may be set in a process of normally processing the voice wakeup. For example, according to some embodiments of this application, only an electronic device closest to the user may be woken up, so that the electronic device closest to the user responds to the wakeup voice, for example, replies with "I am here". According to another embodiment of this application, different wakeup response priorities may be set for different devices, and only an electronic device with a highest priority is woken up. According to still another embodiment of this application, one of the television 201a, the sound box 201*b*, and the smart alarm clock 201*c* that receive the wakeup voice may be selected for wakeup based on power consumption, computing power, and the like. According to still another embodiment of this application, the three devices may be directly woken up, and then a further voice instruction is waited.

The foregoing wakeup response rules are merely used as examples to describe some manners of normally processing the voice wakeup, but are not intended to limit the normal processing of the voice wakeup. In various implementations, various wakeup response manners different from the foregoing manner may be used.

According to some implementations of this application, a part of the preprocessing process performed by the electronic device 201 may be performed by the cloud server 300. For example, the electronic device 201 picks up the sound, and performs speech recognition, and after determining that the picked-up sound is the wakeup voice that includes the wakeup word, the electronic device 201 may directly report the wakeup voice that includes the wakeup word to the cloud server 300. The cloud server 300 obtains the energy information of the wakeup word, and determines whether the energy value of the wakeup word is greater than the wakeup threshold.

A process of determining whether there is an unintentional wakeup according to an embodiment of this application is described below with reference to FIG. 3.

As described above, in the scenario shown in FIG. 1, in a process of playing a program by the television 201*a*, if a sound includes a wakeup word such as "Jim", a surrounding electronic device such as the sound box 201*b* may pick up the wakeup word. When an energy value of the wakeup word received by the sound box 201*b* is greater than the wakeup threshold, the sound box 201*b* is unintentionally woken up. Therefore, a problem that needs to be first resolved in determining whether there is an unintentional wakeup is that a device is unintentionally woken up by a sound that includes the wakeup word and that is emitted by another device.

S1101 and S1102; According to some embodiments of this application, after receiving the voice wakeup messages reported by the television 201*a*, the sound box 201*b*, and the smart alarm clock 201*c*, the cloud server 300 may process the received messages, and then determine, based on a processing result, whether the sound source 100 is a device in the group 200.

According to some embodiments of this application, whether the sound source 100 is a device in the group 200 may be determined by using the distance information in the voice wakeup message. For example, a distance threshold $D_{th}$ may be set. When a distance indicated in the distance information is less than the distance threshold, it is considered that the sound source is the device. The distance threshold $D_{th}$ may be arbitrarily set based on different situations. According to some embodiments of this application, the distance threshold $D_{th}$ may be set to a magnitude of centimeter.

The system shown in FIG. 2 is used as an example. For example, the distance threshold $D_{th}$ is 0.1 m. After the cloud server 300 receives the voice wakeup messages reported by the television 201*a*, the sound box 201*b*, and the smart alarm clock 201*c*, if distance information in the voice wakeup message reported by the television 201*a* indicates that a distance $D_a$ between the sound source and the television 201*a* is equal to 0.05 m, the cloud server 300 compares $D_a$ with the distance threshold $D_{th}$ after obtaining that $D_a$=0.05 m, and may determine that the sound source is the television 201*a* because it is found that $D_a < D_{th}$.

According to some embodiments of this application, if an acoustic echo cancellation (acoustic echo cancellation, AEC) module is disposed in the electronic device 201, when it is found, by using AEC, that the sound is emitted by the electronic device 201, the electronic device 201 may actively report this case to the cloud server 300, so that the cloud server 300 may determine, based on this, that the sound source 100 is a device in the group 200.

Figure 4:
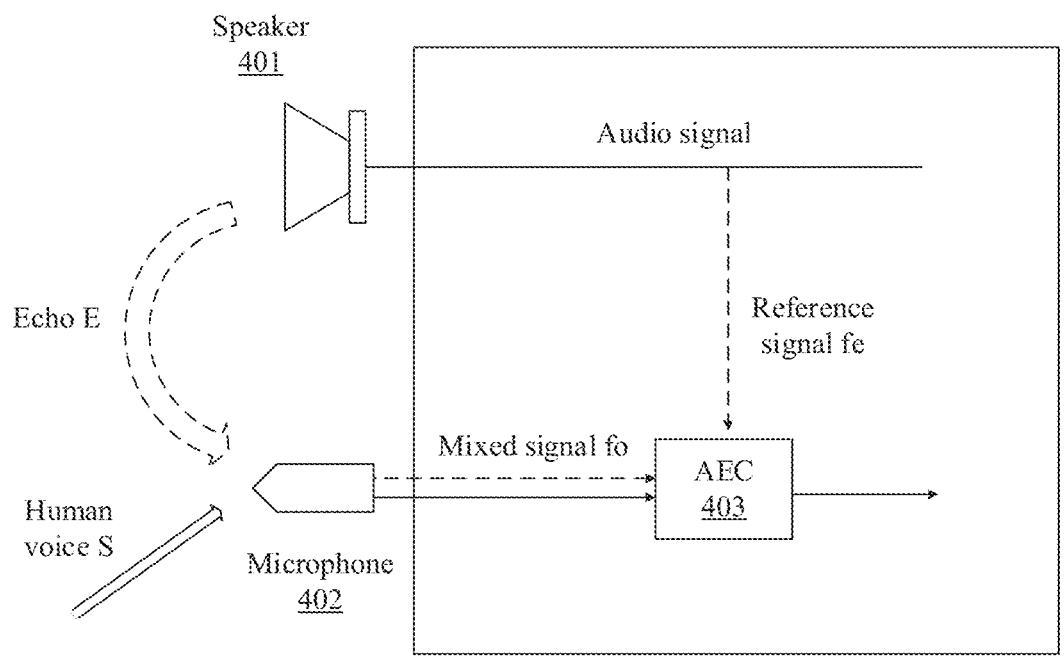
FIG. 4 is an example of AEC processing according to an embodiment of this application.

FIG. 4 shows an example of AEC processing according to an embodiment of this application. As shown in FIG. 4, when an AEC module 403 is disposed in a device, an echo E is generated when the device plays audio by using a speaker 401. When picking up a sound by using an apparatus such as a microphone 402, the device picks up both an external sound S and the echo E, obtains a mixed signal fo, and sends the mixed signal fo to the AEC module 403. In addition, the device sends an audio signal to the AEC module as a reference signal fe. The echo E in the mixed signal fo is highly correlated with the reference signal fe, and a mathematical function may be expressed as E=F(fe). The function F may be referred to as an echo path, and the function may represent a physical process in which a sound emitted by the speaker 401 is reflected a plurality of times on a surface such as a wall or a ceiling. The echo E can be calculated from fe by using the function F, and then the echo E may be subtracted from the mixed signal fo to implement echo cancellation, to obtain the really needed external sound S. Subsequently, the device may further perform processing such as noise reduction by using another module, to obtain a really needed sound, for example, a human voice.

According to some embodiments of this application, it is assumed that the sound box 201*b* finds, by performing processing such as AEC and noise reduction, that the sound is emitted by the sound box 201*b*. In this case, the sound box 201*b* that emits the sound may actively report this case to the cloud server 300. For example, the sound box 201*b* may set a first identifier in the reported voice wakeup message. The first identifier is used to indicate that the wakeup word received by the sound box 201*b* is from the electronic device 201. After receiving the voice wakeup message, the cloud server 300 may determine, by using the first identifier in the voice wakeup message, that the sound source 100 is the sound box 201*b* in the group 200.

When the sound source 100 is a device in the group 200 (in other words, it is determined in S1102 that the sound source 100 is a device in the group 200), S1106 in which the cloud server 300 may directly determine that the voice wakeup messages reported by the television 201*a*, the sound box 201*b*, and the smart alarm clock 201*c* are unintentional wakeups is performed, and subsequently, S13 of sending a wakeup forbidding instruction to each of the television 201*a*, the sound box 201*b*, and the smart alarm clock 201*c* that receive the wakeup voice in FIG. 2 is performed.

Through the foregoing operations, a case in which an electronic device (or a plurality of electronic devices) wakes up another electronic device (or a plurality of other electronic devices) in a same group can be effectively avoided.

In addition to the case in which a device (or a plurality of devices) is unintentionally woken up by a sound that includes a wakeup word and that is emitted by another device (or a plurality of other devices), there may be a case in which an unintentional wakeup is caused by a wakeup word emitted by another device that is not in a same group or an unintentional wakeup is caused by a wakeup word in various types of random noise.

In view of this, an embodiment of this application provides a method for determining an unintentional wakeup based on a type of a sound source.

Figure 5A:
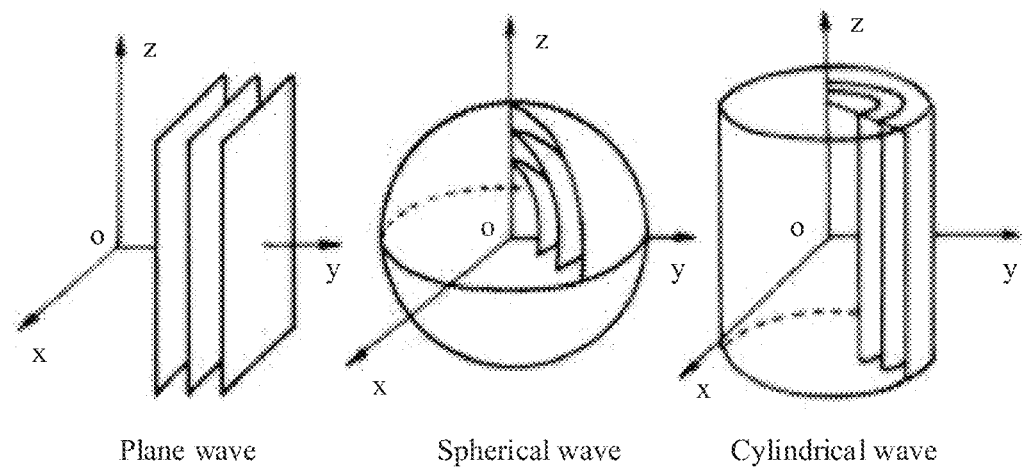
FIG. 5A is a schematic diagram of three waveforms according to an embodiment of this application.

Based on geometric shapes of sound sources, the sound sources may be classified as an area source, a point source, and a line source. For different sound sources, sound waves are radiated in different manners. Usually, the area source radiates in a form of a plane wave, the point source radiates in a form of a spherical wave, and the line source radiates in a form of a cylindrical wave. FIG. 5A schematically shows wavefront patterns of three sound waves: a plane wave, a spherical wave, and a cylindrical wave.

According to some embodiments of this application, when a size of a sound source is relatively small with respect to a wavelength or a propagation distance of a sound wave, and directivity of the sound source is not high, the sound source may be approximately considered as a point source. For example, when a person speaks or claps, it may be considered that a point source emits a sound. The point source radiates outward in a form similar to the spherical wave. It may be considered that the line source includes many point sources. The line source radiates outward in a form similar to the cylindrical wave. The area source radiates outward in a form of the plane wave, effects of radiated sound energy on a plane are always the same, and same sound pressure is obtained regardless of a position that is in front of a sound wall and at which a listener stands.

When a person speaks, a point source type may be considered. Most electronic devices that can emit a sound use a line array loudspeaker system. A wavefront pattern of a sound wave radiated by the line array loudspeaker system is similar to the cylindrical wave, and is similar to that of the line source. In addition, many types of random noise may be classified as line sources or area sources.

Figure 5B:
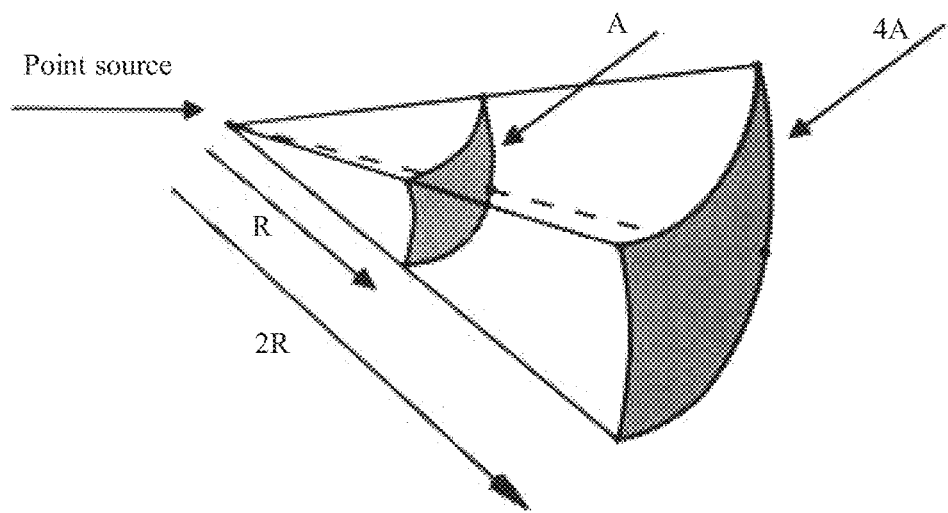
FIG. 5B is a schematic diagram of propagation of a point source according to an embodiment of this application.
Figure 5C:
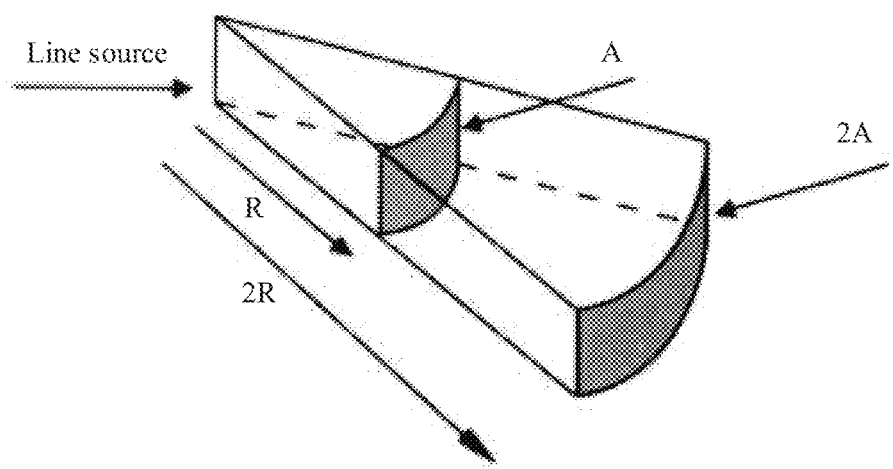
FIG. 5C is a schematic diagram of propagation of a line source according to an embodiment of this application.

For a sound source, a parameter of attenuation with a distance varies with a type of the sound source. FIG. 5B and FIG. 5C schematically and respectively show propagation of a point source and a line source.

As shown in FIG. 5B, a sound radiated by the point source spreads in both horizontal and vertical directions during propagation, and sound energy is attenuated due to an increase in a distance during propagation. In addition, in a free sound field, each time the radiation distance of the point source is doubled (for example, increased from R to 2R shown in FIG. 5B), a surface area is quadrupled (for example, increased from A to 4 A shown in FIG. 5B), and the sound energy is attenuated by 6 dB in terms of a sound pressure level.

As shown in FIG. 5C, a sound radiated by the line source spreads only in a horizontal direction during propagation, which is similar to that of the point source, and sound energy is also attenuated due to an increase in a distance during propagation. However, in a free sound field, each time the radiation distance of the line source is doubled (for example, increased from R to 2R shown in FIG. 5C), a surface area is doubled (for example, increased from A to 2 A shown in FIG. 5C), and the sound energy is attenuated by 3 dB in terms of a sound pressure level.

According to some embodiments of this application, whether there is an unintentional wakeup caused by non-point source point may be determined based on information indicating that energy of sounds emitted by different types of sound sources are attenuated differently with a distance. According to some embodiments of this application, the non-point source noise may include: a noisy speech of a group of people, a sound emitted by a linear sound device, a running sound of a train on a cloud track, and the like. In the prior art, if the electronic device recognizes a wakeup word from the non-point source noise, and an energy value of the received wakeup word is greater than the wakeup threshold, an unintentional wakeup may occur or may be caused.

A method for determining whether there is an unintentional wakeup caused by non-point source noise is described below with reference to FIG. 3.

The method for determining whether there is an unintentional wakeup caused by the non-point source noise may be combined with the operation of determining whether the sound source 100 is a device in the group 200, and performed after it is determined that the sound source 100 is not a device in the group 200 (in other words, it is determined in S1102 that the sound source 100 is not a device in the group 200), or may be independently performed by skipping the operation of determining whether the sound source is a device in the group.

First, S1103: Determine, based on distances and wakeup energy values in voice wakeup messages reported by electronic devices, whether energy attenuation of the wakeup word from the sound source complies with an attenuation law of sound energy radiated by a point source.

Specifically, according to some embodiments of this application, an attenuation coefficient α may be set based on the attenuation law of the point source, and then an attenuation mapping value S of each electronic device may be obtained through calculation with reference to an energy value E of the wakeup word and a distance D between the device and the sound source that are obtained from a voice wakeup message reported by each electronic device:

$$S = \alpha \frac{E}{D}, \qquad (1\text{-}1)$$

where

E represents the energy value of the wakeup word received by the electronic device, D represents the distance between the electronic device and the sound source, where the electronic device may obtain the distance between the electronic device and the sound source by using the foregoing localization algorithm of the microphone array, and then report the distance to the cloud server, and α represents the attenuation coefficient, and is used to represent a correspondence between the sound energy radiated by the point source and a distance from the point source.

When a person speaks, a point source type is considered. Therefore, in the formula (1-1), there may be a limitation that the attenuation coefficient α is an attenuation coefficient of the point source. That is, each time the distance from the point source is doubled, energy is attenuated by 6 dB. According to an embodiment of this application, attenuation of sound energy is non-linear. Therefore, in actual application, a table of correspondence between the attenuation coefficient and the distance may be stored in a server. After the distance between the electronic device and the sound source is obtained, a corresponding value of the attenuation coefficient α is obtained by querying the table.

The attenuation mapping value S is negatively correlated with the distance D and positively correlated with the wakeup energy information E and the attenuation coefficient α. That is, a longer distance D indicates a smaller attenuation mapping value, and a larger wakeup energy information E and/or a larger attenuation coefficient α indicate/indicates a larger attenuation mapping value. When the wakeup sound source is a point source, attenuation mapping values corresponding to the electronic devices that pick up the wakeup word should be basically equal, in other words, S1=S2= . . . =Sn (1-2), where 1, 2, . . . , and n represent device serial numbers of n devices, and S1, S2, . . . , and Sn respectively represent attenuation mapping values corresponding to the n devices.

Certainly, in some cases, even if the wakeup sound source is a point source, the equation (1-2) may not entirely hold true. In consideration of a difference between the devices and impact of a data error, it may be considered that the wakeup is not an unintentional wakeup provided that a difference between calculation results of the attenuation mapping values of the devices 1-n falls within a specific error range, in other words, a difference between the attenuation mapping values of the devices does not exceed a preset difference threshold.

According to some embodiments of this application, when the attenuation mapping value of the electronic device is calculated, ambient energy information, namely, an energy value of an ambient sound around the electronic device, may be further considered. A mean value W of ambient sound energy in a period of time is calculated by using the energy value of the ambient sound collected by the electronic device, and is used to positively or negatively correct the energy value of the wakeup word. Alternatively, the energy value of the wakeup word may be positively or negatively corrected based on an energy value V of an instantaneous ambient sound picked up when the electronic device picks up the wakeup word. Through this correction, accuracy of determining whether the energy value E of the wakeup word is greater than the wakeup threshold $E_{th}$ in the preprocessing of S3-S5 in FIG. 2 can be improved. In addition, in calculating the attenuation mapping value S, impact of the energy value of the ambient sound on the energy value of the wakeup word in a noise scenario can be reduced, and impact on accuracy of the attenuation mapping value can be further reduced.

In addition, according to some embodiments of this application, due to a hardware limitation such as a device memory, a microphone array, and computing power of a chip, algorithms used for reducing noise in a sound, picking up a sound, and the like may not necessarily be the same for various electronic devices. Even if a same algorithm is used, the algorithm needs to be adjusted to some extent to adapt to different devices. Therefore, unintentional wakeup rates of different electronic devices may be different. In this case, when the attenuation mapping value S of each electronic device is calculated, a device type factor μ may be added to correct the device, to eliminate or reduce impact of hardware and/or algorithm differences between different devices.

Therefore, with reference to impact of the foregoing factors, according to some embodiments of this application, the mean value W of the ambient sound energy and the device type factor μ may be considered in calculating the attenuation mapping value S of each electronic device, in other words, $$S = \alpha\mu\frac{E-W}{D}, \quad (1-3)$$

where

E represents the energy value of the wakeup word received by the electronic device, W represents the mean value of the ambient sound energy collected by the electronic device in a preset period of time, D represents the distance between the electronic device and the sound source, where the electronic device may obtain the distance between the electronic device and the sound source by using the foregoing localization algorithm of the microphone array, and then report the distance to the cloud server, α represents the attenuation coefficient, and is used to represent a correspondence between the sound energy radiated by the point source and a distance from the point source, and μ represents the device type factor, and is used to correct a hardware difference between different devices.

In different embodiments, in calculating the attenuation mapping value S, an additional parameter may be added as required, to further improve calculation accuracy. Alternatively, some parameters may be removed, to improve a calculation speed, reduce power consumption, or the like. For example, in some implementations, there may be a small difference between electronic devices in a same group. In this case, the device type factor μ may be ignored. When the device type factor μ is not considered, the attenuation mapping value S may be calculated as follows:

$$S = \alpha\frac{E-W}{D}. \quad (1-4)$$

In the foregoing description, the attenuation mapping values corresponding to the electronic devices are calculated by properly using data such as the distance, the energy value, and the attenuation coefficient that are obtained in the wakeup process, whether the attenuation mapping values corresponding to the electronic devices are equal or basically equal is determined, and whether there is an unintentional wakeup is determined by using a determining result. In this way, the existing data is fully utilized, and no additional hardware or complex algorithm needs to be added. Therefore, the solution has relatively low complexity.

Figure 6:
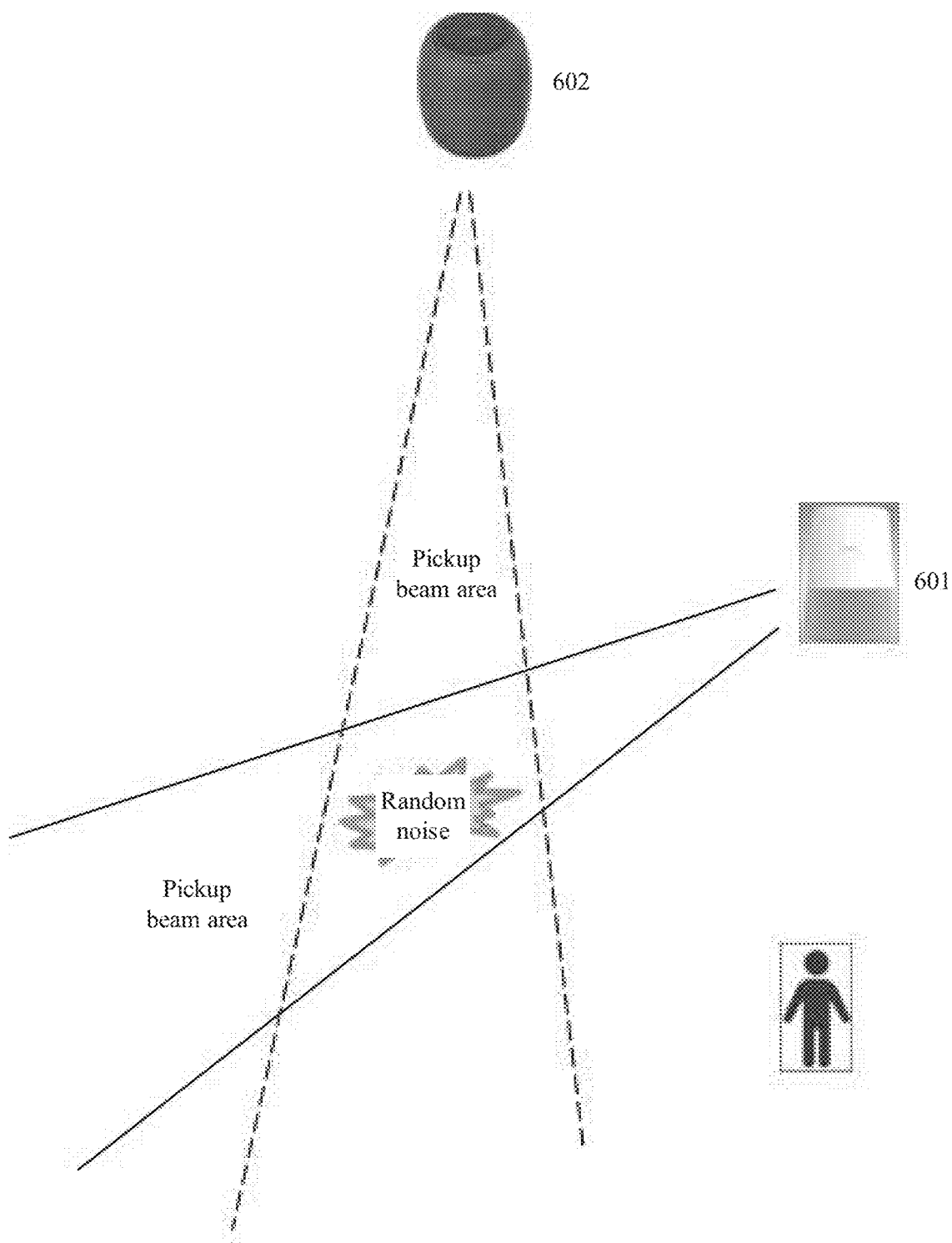
FIG. 6 is a schematic diagram of an unintentional wakeup triggered by random non-point source noise according to an embodiment of this application.

How to avoid, by using the foregoing formula, a case in which random non-point source noise triggers an unintentional wakeup is described below with reference to FIG. 6. According to some embodiments of this application, as shown in FIG. 6, it is assumed that the random noise includes a wakeup word, and both a white sound box 601 and a black sound box 602 pick up the wakeup word in the random noise. In one case, an energy value E1 of the wakeup word received by the white sound box 601 reaches 70, and it is obtained, by using a localization algorithm of a microphone array, that a distance D1 between a sound and the white sound box 601 is 3 m. In addition, an energy value E2 of the wakeup word received by the black sound box 602 reaches 35, and it is obtained, by using the localization algorithm of the microphone array, that a distance D2 between the sound and the black sound box 602 is 5 m. If an attenuation mapping value S is calculated by using the formula (1-3), based on the formula (1-2), for the white sound box 601, when E1=70 and D1=3 m, a theoretical energy value E2 of the wakeup word received by the black sound box 602 whose distance D2 from the sound source is 5 m should range from 40 to 41. However, due to the random non-point source noise at this time, the wakeup energy value E2 actually reported by the black sound box is 35, which does not match the formula (1-2). Therefore, it may be determined that a current wakeup is an unintentional wakeup. Subsequently, a wakeup forbidding instruction may be delivered to the sound boxes 601 and 602, so that neither the sound box 601 nor the sound box 602 is woken up. Therefore, the problem of an unintentional wakeup caused by the non-point source noise is resolved.

Figure 3:
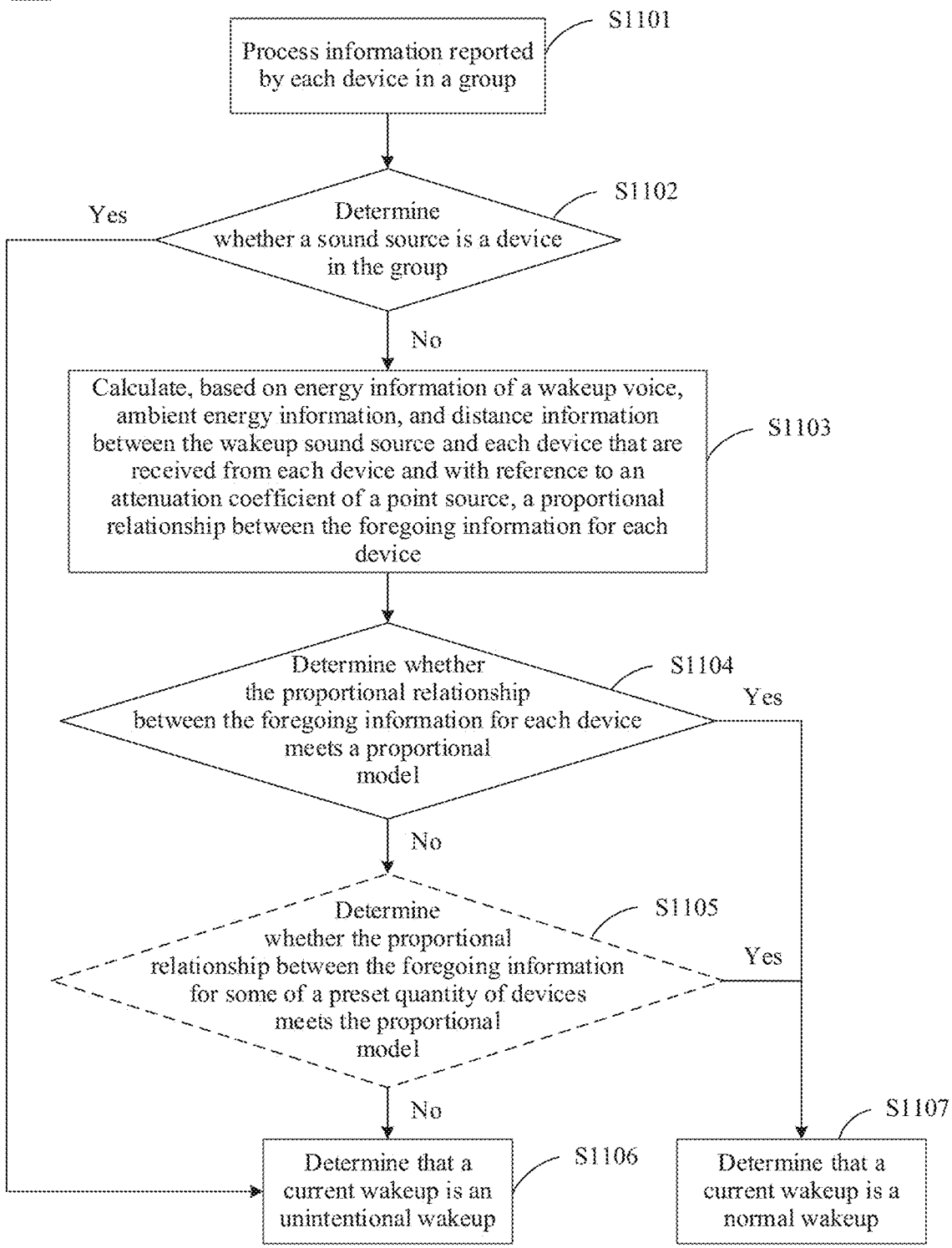
FIG. 3 is a flowchart of a method for determining an unintentional wakeup according to an embodiment of this application.

In addition, in the operation S11 in the example shown in FIG. 2, according to some embodiments of this application, after receiving the voice wakeup messages reported by the television 201a, the sound box 201b, and the smart alarm clock 201c, the cloud server 300 may perform the operations of S1103 and S1104 in FIG. 3, calculate the attenuation mapping value by using the formula (1-3), and calculate whether attenuation mapping values corresponding to the three electronic devices are equal or basically equal, to determine whether there is an unintentional wakeup. If the sound source 100 is a person who speaks, the energy attenuation of the wakeup word from the sound source 100 basically complies with the attenuation law of the sound energy radiated by the point source, that is, proportional relationships that are between various types of information and that correspond to the television 201a, the sound box 201b, and the smart alarm clock 201c are equal or basically equal, in other words, $$\alpha_A \mu_A \frac{E_A - W_A}{D_A} = \alpha_B \mu_B \frac{E_B - W_B}{D_B} = \alpha_C \mu_C \frac{E_C - W_C}{D_C}. \quad (1-5)$$

If the equation (1-5) holds true, it may be considered that the received wakeup is a normal wakeup, and the cloud server 300 may send the instruction for normally processing the voice wakeup, as described in S14. However, when the equation (1-5) does not hold true, it may be considered that the wakeup is an unintentional wakeup, and the cloud server 300 may send the wakeup forbidding instruction to each of the electronic devices, as described in S13.

In addition, according to some embodiments of this application. S1105: When there are a relatively large quantity of electronic devices that pick up the wakeup word, in calculating the proportion, data of at least one worst voice wakeup message may be removed, and whether the energy attenuation that is of the wakeup word and that is obtained through calculation by using data, other than data of the one or more worst voice wakeup messages, of another device complies with the attenuation law of the sound energy radiated by the point source is calculated. When there is a predetermined proportion of electronic devices whose difference between the attenuation mapping values is less than a difference threshold in the plurality of electronic devices, it is determined that the wakeup is not an unintentional wakeup. In this way, a case in which in some extreme scenarios, wakeup-related data of a specific electronic device always fails to meet a criterion is avoided. For example, when determining is performed by using the formula (1-2), if n=10, attenuation mapping values S1, . . . , and S9 of electronic devices 1 to 9 are equal or basically equal, and only an attenuation mapping value S10 of an electronic device 10 is inconsistent with the attenuation mapping values of the preceding nine electronic devices, data of the electronic device 10 may be discarded, and the wakeup is still determined as a normal wakeup.

The process for determining whether there is an unintentional wakeup according to the embodiments of this application that is described above with reference to FIG. 3 may be performed by the cloud server 300 as a complete process. In some implementations, the cloud server 300 may perform only a part of the process, for example, perform only S1101 and S1102 without performing S1103 to S1105, and determine, based on a determining result in S1102, whether the wakeup is an unintentional wakeup. Alternatively, the cloud server 300 directly performs S1103 and S1104 without performing S1101 and S1102, calculates the attenuation mapping value of each device to determine whether a type of the sound source is a point source, so as to determine whether the wakeup is an unintentional wakeup, and the like.

According to some embodiments of this application, after receiving the first voice wakeup message, the cloud server 300 starts timing, and may not receive, in a threshold time, a voice wakeup message reported by another electronic device 201. In this case, only S1101 and S1102 may be performed, and whether the sound source is a device in the group is determined based on the received voice wakeup message, to determine whether the wakeup is an unintentional wakeup. When the wakeup is an unintentional wakeup, the wakeup forbidding instruction is sent to the electronic device that reports the voice wakeup message. In some cases, the cloud server 300 may process the wakeup by using another means. For example, if an electronic device that reports the first voice wakeup message finds, through processing such as AEC and noise reduction, that the sound is emitted by the electronic device, the electronic device is not woken up. In this case, the cloud server 300 does not need to send the wakeup forbidding instruction. In some cases, the cloud server 300 may directly normally process the wakeup based on various existing common means.

In addition, according to some embodiments of this application, in the operation of starting timing and collecting, in the threshold time, a voice wakeup message reported by another electronic device in the group in S10, the cloud server 300 may set a receiving quantity threshold for the collected voice wakeup messages, and end timing in advance after a quantity of received voice wakeup messages reaches the receiving quantity threshold. For example, the receiving quantity threshold may be set to 4, that is, a maximum of four voice wakeup messages reported by the another electronic device are received, to reduce a time of waiting to collect the voice wakeup message.

The solution in which the cloud server controls voice wakeup of the plurality of devices in the device group is described above with reference to FIG. 2 to FIG. 6. However, the types and quantities of electronic devices described above with reference to the accompanying drawings are examples. In various embodiments, the foregoing solutions and technologies may be applied to various quantities and types of electronic devices.

According to some embodiments of this application, the cloud server 300 shown in FIG. 2 may not be included, and the operation performed by the cloud server 300 may be performed by one or more devices in the group 200. For example, according to some embodiments of this application, the sound box 201b may be used as a primary device, and another electronic device (for example, the television 201a and the smart alarm clock 201c) may be used as a secondary device. After picking up the wakeup word, the devices in the group 200 uniformly report the voice wakeup messages to the sound box 201b, and the sound box 201b performs the operation of determining whether there is an unintentional wakeup and the operation of indicating the devices in the group 200 to or not to respond to the wakeup.

Alternatively, according to some embodiments of this application, the cloud server 300 shown in FIG. 2 may be replaced with another third-party device. For example, in a smart household scenario, the third-party device may be a router to which a plurality of smart household devices are connected.

Various embodiments of this application are described above with reference to FIG. 2 to FIG. 6. Whether there is an unintentional wakeup is determined by using the voice wakeup messages reported by the plurality of electronic devices. Whether the sound source is a device in the group is determined to determine whether the current wakeup is an unintentional wakeup. In addition, whether the attenuation mapping values of the devices are basically equal is calculated by using relative information between the plurality of devices, to determine an unintentional wakeup caused by the non-point source noise. In this way, an unintentional wakeup rate can be effectively reduced, and user experience can be improved. In addition, the solutions provided in the embodiments of this application have low complexity, can be implemented by using existing data, and do not require addition of new hardware or a new complex algorithm for calculation.

In addition, the voice wakeup processing solutions described above with reference to FIG. 2 to FIG. 6 may be applied to a smart household scenario, or may be applied to various scenarios in which a plurality of intelligent voice devices appear in specific space, for example, an in-vehicle scenario that includes a plurality of intelligent vehicle-mounted devices.

Figure 7:
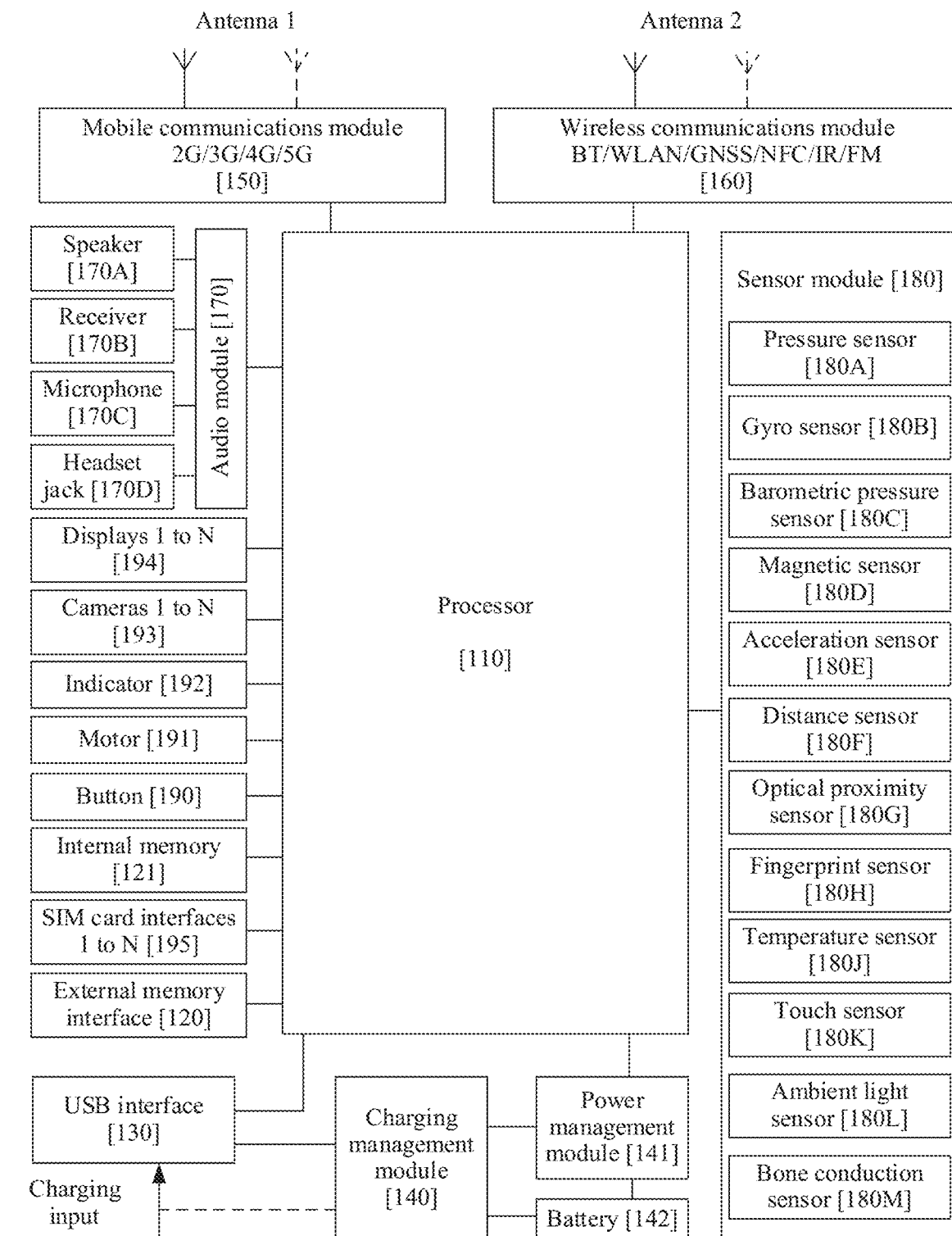
FIG. 7 is a schematic structural diagram of an electronic device according to an embodiment of this application.

The following uses a mobile phone as an example to describe an example of a structure of an electronic device 201 in an embodiment of this application with reference to FIG. 7.

The electronic device 201 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of this application does not constitute a specific limitation on the electronic device 201. In some other embodiments of this application, the electronic device 201 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors. The processor 110 may be configured to perform various operations performed by the cloud server 300 or the electronic device 201 described with reference to FIG. 2 to FIG. 6.

A memory may be further disposed in the processor 110, and is configured to store instructions and data In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110. Therefore, system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identity module, SIM) interface, a universal serial bus (universal serial bus, USB) interface, and/or the like. It may be understood that an interface connection relationship between the modules illustrated in this embodiment of this application is merely an example for description, and does not constitute a limitation on the structure of the electronic device 201. In some other embodiments of this application, the electronic device 201 may alternatively use an interface connection manner different from that in the foregoing embodiment, or a combination of a plurality of interface connection manners.

The charging management module 140 is configured to receive a charging input from the charger. The charger may be a wireless charger or a wired charger.

The power management module 141 is configured to connect the battery 142 and the charging management module 140 to the processor 110. The power management module 141 receives an input of the battery 142 and/or an input of the charging management module 140, and supplies power to the processor 110, the internal memory 121, the display 194, the camera 193, the wireless communications module 160, and the like. The power management module 141 may be further configured to monitor parameters such as a battery capacity, a quantity of battery cycles, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 201 may be implemented by using the antenna 1, the antenna 2, the mobile communications module 150, the wireless communications module 160, the modem processor, the baseband processor, and the like.

The antenna 1 and the antenna 2 are configured to: transmit and receive electromagnetic wave signals. Each antenna in the electronic device 201 may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the electronic device 201. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit the received electromagnetic wave to the modem processor for demodulation. The mobile communications module 150 may further amplify a signal modulated by the modem processor, and convert an amplified signal into an electromagnetic wave through the antenna 1 for radiation. In some embodiments, at least some functional modules of the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal by using an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another functional module.

The wireless communications module 160 may provide a wireless communication solution that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 201. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave through the antenna 2 for radiation.

The electronic device 201 implements a display function through the GPU, the display 194, the application processor, and the like. The GPU is a microprocessor for image processing, and connects the display 194 to the application processor. The GPU is configured to: perform mathematical and geometric calculation, and render an image. The processor 110 may include one or more GPUs that execute program instructions to generate or change display information.

The internal memory 121 may be configured to store computer executable program code. The executable program code includes instructions. The internal memory 121 may include a program storage area and a data storage area. The program storage area may store an operating system, an application required by at least one function (for example, a sound playing function or an image playing function), and the like. The data storage area may store data (such as audio data and a phone book) created during use of the electronic device 201, and the like. In addition, the internal memory 121 may include a high-speed random access memory, or may include a non-volatile memory, for example, at least one magnetic disk storage device, a flash storage device, a universal flash storage (universal flash storage, UFS), or the like. The processor 110 runs the instructions stored in the internal memory 121 and/or the instructions stored in the memory disposed in the processor, to perform various function applications of the electronic device 201 and data processing.

The electronic device 201 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some functional modules of the audio module 170 are disposed in the processor 110.

The speaker 170A, also referred to as a "horn", is configured to convert an audio electrical signal into a sound signal. The electronic device 201 may be configured to: listen to music or answer a hands-free call by using the speaker 170A.

The receiver 170B, also referred to as an "earpiece", is configured to convert an electrical audio signal into a sound signal. When a call is answered or speech information is received by using the electronic device 201, the receiver 170B may be put close to a human ear to receive a speech.

The microphone 170C, also referred to as a "mike" or a "microphone", is configured to convert a sound signal into an electrical signal. When making a call or sending speech information, a user may make a sound by moving a human mouth close to the microphone 170C to input a sound signal to the microphone 170C. At least one microphone 170C may be disposed in the electronic device 201. In some other embodiments, two microphones 170C may be disposed in the electronic device 201, to implement a noise reduction function in addition to collecting a sound signal. In some other embodiments, three, four, or more microphones 170C may alternatively be disposed in the electronic device 201, to collect a sound signal, reduce noise, identify a sound source, implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

Figure 8:
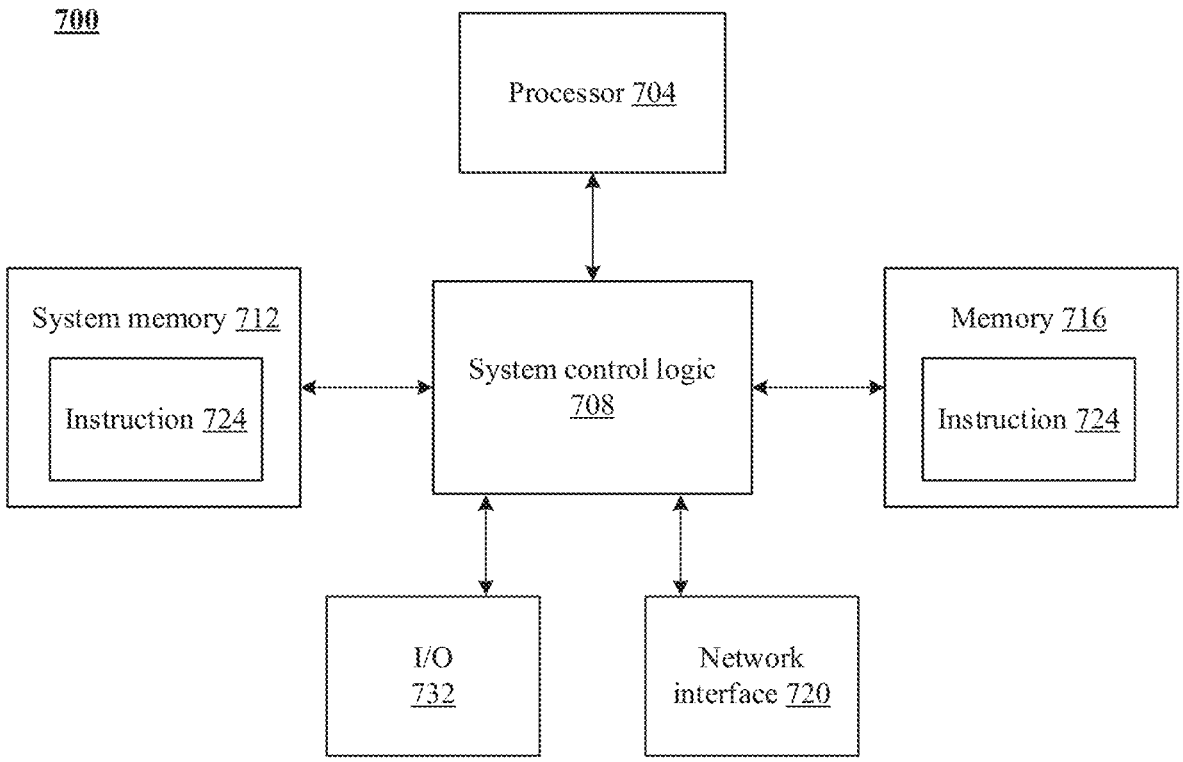
FIG. 8 is a schematic diagram of an example computing system according to some embodiments of this application.

The following describes a computing system 700 according to some embodiments of this application with reference to FIG. 8. In the embodiments of this application, the system 700 may be or may include a part of the cloud server 300, or may be or may include a part of the electronic device 201. In addition, in various embodiments, the system 700 may include more or fewer components and/or different architectures.

In an embodiment, the system 700 may include one or more processors 704, system control logic 708 connected to at least one of the processors 704, system memory 712 connected to the system control logic 708, a memory 716 (for example, a non-volatile memory (non-volatile memory, NVM)) connected to the system control logic 708, and a network interface 720 connected to the system control logic 708.

The processor 704 may include one or more single-core or multi-core processors. The processor 704 may include any combination of a general-purpose processor and a dedicated processor (for example, a graphics processor, an application processor, or a baseband processor). In some cases, the processor 704 may be configured to perform various operations performed by the cloud server 300 or the electronic device 201 described with reference to FIG. 2 to FIG. 6.

In an embodiment, the system control logic 708 may include any proper interface controller to provide any proper interface for at least one of the processors 704 and/or any proper device or component that communicates with the system control logic 708. In an embodiment, the system control logic 708 may include one or more memory controllers to provide an interface connected to the system memory 712. The system memory 712 may be configured to: load and store data and/or instructions. For example, for the system 700, in an embodiment, the system memory 712 may include any proper volatile memory, for example, a proper random access memory (random-access memory, RAM) or a dynamic random access memory (dynamic random access memory, DRAM).

The memory 716 may include one or more tangible non-transitory computer readable media that are configured to store data and/or instructions. For example, the memory 716 may include any proper non-volatile memory and/or any proper non-volatile storage device, for example, a flash memory, a hard disk drive (hard disk drive, HDD), a solid-state drive (solid-state drive, SSD), and a compact disk (compact disk, CD) drive, and/or a digital versatile disk (digital versatile disk, DVD) drive.

The memory 716 may include some storage resources on an apparatus on which the system 700 is installed, or may be accessed by a device, but is not necessarily a part of the device. For example, the memory 716 may be accessed by using the network interface 720 through a network.

In particular, the system memory 712 and the memory 716 each may include a temporary copy and a permanent copy of an instruction 724. The instruction 724 may include an instruction that leads, when the instruction is executed by at least one of the processors 704, the system 700 to implement the method described above. In various embodiments, the instruction 724, hardware, firmware, and/or software components of the system may additionally/alternatively be deployed in the system control logic 708, the network interface 720, and/or the processor 704.

The network interface 720 may include a transceiver, and is configured to provide a radio interface for the system 700 to communicate with any other proper device (for example, a front-end module or an antenna) through one or more networks. In various embodiments, the network interface 720 may be integrated with another component of the system 700. For example, the network interface may include a processor of the processor 704, memory of the system memory 712, a memory of the memory 716, and/or a firmware device (not shown) having an instruction. The instruction is an instruction that leads, when the instruction is executed by at least one of the processors 704, the system 700 to implement the method performed by the cloud server 300 or the electronic device 201 in FIG. 2 and FIG. 3.

The network interface 720 may further include any proper hardware and/or firmware to provide a multiple-input multiple-output radio interface. For example, in an embodiment, the network interface 720 may be a network adapter, a wireless network adapter, a telephone modem, and/or a wireless modem.

In an embodiment, at least one of the processors 704 may be packaged together with logic of one or more controllers used for the system control logic 708. In an embodiment, at least one of the processors 704 may be packaged together with logic of one or more controllers used for the system control logic 708 to form a system in package (SiP). In an embodiment, at least one of the processors 704 may be integrated with logic of one or more controllers used for the system control logic 708. In an embodiment, at least one of the processors 704 may be integrated with logic of one or more controllers used for the system control logic 708 to form a system-on-a-chip (SoC).

The system 700 may further include an input/output (I/O) device 732. The I/O device 732 may include a user interface designed to enable a user to interact with the system 700, a peripheral component interface designed to enable a peripheral component to also interact with the system 700, a sensor designed to determine environmental conditions and/or location information associated with the system 700, and/or the like.

Embodiments disclosed in this application may be implemented in hardware, software, firmware, or a combination of these implementation methods. The embodiments of this application may be implemented as a computer program or program code executed on a programmable system, and the programmable system may include at least one processor, a storage system (including volatile and non-volatile memories and/or a storage element), at least one input device, and at least one output device.

The program code may be applied to input instructions to perform functions described in this application and generate output information. The output information may be applied to one or more output devices in a known manner. For the purposes of this application, a processing system includes any system having a processor such as a digital signal processor (DSP), a microcontroller, an application-specific integrated circuit (ASIC), or a microprocessor.

The program code may be implemented by using a high-level programming language or an object-oriented programming language, to communicate with the processing system. The program code may also be implemented by using an assembly language or a machine language when required. Actually, a mechanism described in this application is not limited to the scope of any particular programming language. In any case, the language may be a compiled language or an interpretive language.

In some cases, the disclosed embodiments may be implemented in hardware, firmware, software, or any combination thereof. The disclosed embodiments may also be implemented in a form of instructions or programs carried or stored on one or more transient or non-transient machine readable (for example, computer readable) storage media, and the instructions or the programs may be read and executed by one or more processors or the like. When the instructions or the programs are run by a machine, the machine may perform the foregoing various methods. For example, the instructions may be distributed through a network or another computer readable medium. Therefore, the machine readable medium may include but is not limited to any mechanism used to store or transmit information in a machine (for example, computer) readable form, for example, a floppy disk, a compact disc, a compact disc read-only memory (CD-ROMs), a magnetic disc, a read-only memory (ROM), a random access memory (RAM), an erasable programmable read-only memory (EPROM), an electronically erasable programmable read-only memory (EEPROM), a magnetic card, an optical card, a flash memory used to transmit network information by using an electrical signal, an optical signal, an acoustic signal, or another form of signal (for example, a carrier, an infrared signal, or a digital signal), or a tangible machine readable memory. Therefore, the machine readable medium includes any form of machine readable medium that is suitable for storing or transmitting electronic instructions or machine (for example, computer) readable information.

Therefore, the embodiments of this application further include a non-transient tangible machine readable medium. The medium includes instructions or design data, for example, a hardware description language (HDL), and defines a structure, a circuit, an apparatus, a processor, and/or a system feature described in this specification. These embodiments are also referred to as program products.

According to some embodiments of this application, to implement functions in the method provided in the embodiments of this application, the electronic device 201 or the cloud server 300 may include a hardware structure and/or a software module, and implement the functions in a form of the hardware structure, the software module, or a combination of the hardware structure and the software module. Whether a function in the foregoing functions is performed by the hardware structure, the software module, or the combination of the hardware structure and the software module depends on particular applications and design constraints of the technical solutions.

Figure 9:
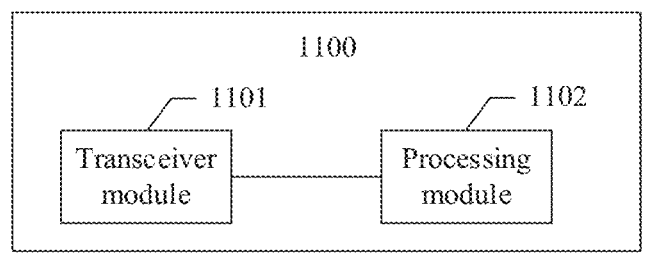
FIG. 9 is a schematic diagram of a device according to an embodiment of this application.

FIG. 9 shows a device 1100 according to an embodiment of this application. For example, the device 1100 includes a transceiver module 1101 and a processing module 1102.

According to some embodiments of this application, when the device 1100 is the cloud server 300, the device 1100 may perform various operations performed by the cloud server 300 in the voice wakeup methods shown in FIG. 2 and FIG. 3. For example, according to some embodiments of this application, a voice wakeup apparatus may be provided, and the voice wakeup apparatus may be implemented in the cloud server 300. The voice wakeup apparatus 110 may include a transceiver module 1101 and a processing module 1102. According to some embodiments of this application, the voice wakeup apparatus may be configured to perform various operations performed by the cloud server 300 described with reference to FIG. 2 to FIG. 6. For example, the transceiver module 1101 may be configured to perform operations S10, S13, S14, and the like, and the processing module 1102 may be configured to perform operations S11, S12, and the like.

When an operation of the cloud server 300 is performed by an electronic device or a third-party device in the group 200, the voice wakeup apparatus may also be implemented in the electronic device or the third-party device in the group 200, to perform various operations performed by the electronic device or the third-party device in the group 200.

According to some embodiments of this application, when the device 1100 is the electronic device 201, the device 1100 may perform an operation performed by the electronic device 201 in the voice wakeup method shown in FIG. 2. The transceiver module 1101 may be configured to perform operations S6 to S8 and the like. The processing module 1102 may be configured to perform operations S1, S3 to S5, and the like.

Figure 10:
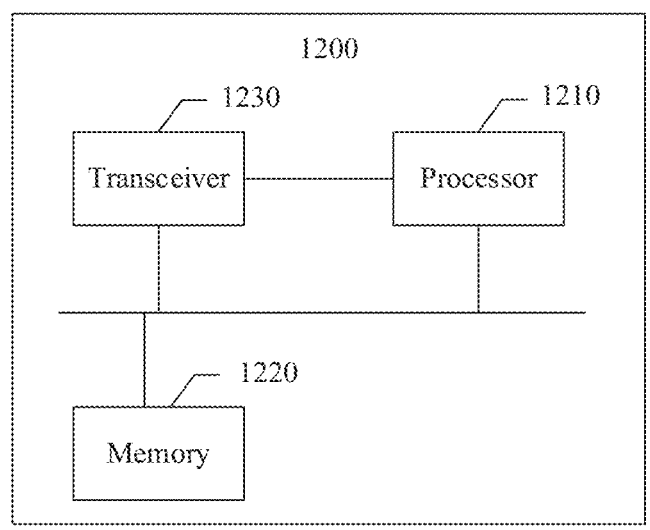
FIG. 10 is a schematic diagram of a device according to another embodiment of this application.

FIG. 10 shows another device 1200 according to an embodiment of this application. The device 1200 includes at least one processor 1210, a memory 1220, and a transceiver 1230. The processor 1210 is coupled to the memory 1220 and the transceiver 1230. Coupling in this embodiment of this application is direct coupling, indirect coupling, or communication connection between apparatuses, units, or modules, may be implemented in electrical, mechanical, or another form, and is used for information exchange between the apparatuses, the units, or the modules. A connection medium between the transceiver 1230, the processor 1210, and the memory 1220 is not limited in this embodiment of this application. For example, according to some embodiments of this application, the memory 1220, the processor 1210, and the transceiver 1230 may be connected through a bus. The bus may be classified into an address bus, a data bus, a control bus, and the like.

The memory 1220 may be configured to store program instructions. The transceiver 1230 may be configured to; receive and send data. The processor 1210*ky* is configured to invoke the program instructions stored in the memory 1220, so that the device 1200 performs an operation performed by the cloud server 300 in FIG. 2 or FIG. 3, or performs an operation performed by the electronic device 201 in FIG. 2.

According to some embodiments of this application, the processor 1210 may be a general-purpose processor, a digital signal processor, an application-specific integrated circuit, a field programmable gate array or another programmable logic device, a discrete gate or a transistor logic device, or a discrete hardware component, and may implement or execute the methods, operations, and logical block diagrams disclosed in the embodiments of this application. The general-purpose processor may be a microprocessor, any conventional processor, or the like. The operations in the methods disclosed with reference to the embodiments of this application may be directly performed and completed by a hardware processor, or may be performed and completed by a combination of hardware in the processor and a software module.

According to some embodiments of this application, the memory 1220 may be a non-volatile memory or a volatile memory. The memory is any other medium that can carry or store expected program code in a form of an instruction structure or a data structure and that can be accessed by a computer, but is not limited thereto. The memory in the embodiments of this application may alternatively be a circuit or any other apparatus that can implement a storage function, and is configured to store the program instructions and/or the data.

The foregoing describes the embodiments of this application in detail with reference to the accompanying drawings. However, use of the technical solutions of this application is not limited to various applications mentioned in the embodiments of this application, and various structures and variations may be easily implemented with reference to the technical solutions of this application, to achieve various beneficial effects mentioned in this specification. Various variations made by a person of ordinary skill in the art without departing from the purpose of this application shall fall within the scope of this application.

What is claimed is:

1. A method implemented by a cloud server, wherein the method comprises:
   receiving a plurality of voice wakeup messages sent by a plurality of electronic devices and comprising distances and wakeup energy values, wherein each voice wakeup message comprises a first distance and a wakeup energy value, wherein the first distance is between a respective electronic device that sends the voice wakeup message and a sound source, and wherein the wakeup energy value is of a wakeup word that is emitted by the sound source and is received by the respective electronic device that sends the voice wakeup message;
   calculating an attenuation mapping value of the respective electronic device, wherein the attenuation mapping value is negatively correlated with the first distance and positively correlated with the wakeup energy value of the respective electronic device and an attenuation coefficient, and wherein the attenuation coefficient represents a correspondence between sound energy and distance from a point source;
   evaluating an energy attenuation based on the attenuation mapping value, the first distance and the wakeup energy value; and
   sending, when the energy attenuation does not comply with an attenuation law, a wakeup forbidding instruction to the respective electronic device.

2. The method according to claim 1, wherein the method further comprises:
   calculating differences between attenuation mapping values of the plurality of electronic devices; and
   determining, based on the calculated differences, whether the energy attenuation of the wakeup word complies with the attenuation law.

3. The method according to claim 2, wherein the method further comprises determining, when there is a predetermined number of electronic devices with respective differences from the calculated differences that are less than a difference threshold, that the energy attenuation of the wakeup word complies with the attenuation law.

4. The method according to claim 2, wherein the attenuation mapping value is calculated based on a formula of:

$$\text{attenuation coefficient} \times \frac{\text{wakeup energy value}}{\text{distance}}.$$

5. The method according to claim 2, wherein the attenuation mapping value is calculated based on an ambient sound energy value and a formula of:

$$\text{attenuation coefficient} \times \frac{\text{wakeup energy value} - \text{ambient sound energy value}}{\text{distance}},$$

wherein the ambient sound energy value represents an energy value of an ambient sound collected by the respective electronic device.

6. The method according to claim 5, wherein the voice wakeup message comprises the ambient sound energy value.

7. The method according to claim 1, wherein the plurality of electronic devices are located in a same group, and are managed by a same account.

8. The method according to claim 7, wherein the method further comprises:
   receiving a voice wakeup request sent by a first electronic device in the plurality of electronic devices;
   starting time period; and
   receiving, in the timing period, the voice wakeup message sent by a second electronic device in a group of the plurality of electronic devices.

9. The method according to claim 8, wherein the method further comprises ending the timing period in advance after a quantity of received voice wakeup messages reaches a preset receiving quantity threshold.

10. A device comprising:
    a memory configured to store instructions; and
    a processor coupled to the memory, wherein when executed by the processor, the instructions cause the device to be configured to:
    receive a plurality of voice wakeup messages sent by a plurality of electronic devices and comprising distances and wakeup energy values, wherein each voice wakeup message comprises a first distance and a wakeup energy value, and wherein the first distance is between a respective electronic device that sends the voice wakeup message and a sound source, and the wakeup energy value is of a wakeup word that is emitted by the sound source and is received by the respective electronic device that sends the voice wakeup message;
    calculate an attenuation mapping value of the respective electronic device, wherein the attenuation mapping value is negatively correlated with the first distance and positively correlated with the wakeup energy value of the respective electronic device and an attenuation coefficient, and wherein the attenuation coefficient represents a correspondence between sound energy and distance from a point source;
    evaluate an energy attenuation based on the attenuation mapping value, the first distance and the wakeup energy value; and
    send, when the energy attenuation does not comply with an attenuation law, a wakeup forbidding instruction to the respective electronic device.

11. The device of according to claim 10, wherein when executed by the processor, the instructions further cause the device to be configured to:
    calculate differences between attenuation mapping values of the plurality of electronic devices; and
    determine, based on the calculated differences, whether the energy attenuation of the wakeup word complies with the attenuation law.

12. The device according to claim 11, wherein when executed by the processor, the instructions further cause the device to be configured to determine, when there is a predetermined number of electronic devices with respective differences from the calculated differences that are less than a difference threshold, that the energy attenuation of the wakeup word complies with the attenuation law.

13. The device according to claim 11, wherein the attenuation mapping value is calculated based on a formula of:

$$\text{attenuation coefficient} \times \frac{\text{wakeup energy value}}{\text{distance}}.$$

14. The device according to claim 11, wherein the attenuation mapping value is calculated based on an ambient sound energy value and a formula of:

$$\text{attenuation coefficient} \times \frac{\text{wakeup energy value} - \text{ambient sound energy value}}{\text{distance}},$$

wherein the ambient sound energy value represents an energy value of an ambient sound collected by the respective electronic device.

15. The device according to claim 14, wherein the voice wakeup message comprises the ambient sound energy value.

16. A voice wakeup method implemented by a device, wherein the method comprises:
- receiving a first voice wakeup message sent by a first electronic device, wherein the first voice wakeup message comprises a first distance and a first wakeup energy value, wherein the first distance is between the first electronic device and a sound source, and wherein the first wakeup energy value is of a wakeup word that is emitted by the sound source;
- determining, based on the first voice wakeup message, whether the sound source is the first electronic device;
- sending, when the sound source is the first electronic device, a first wakeup forbidding instruction to the first electronic device;
- calculating an attenuation mapping value of the respective electronic device, wherein the attenuation mapping value is negatively correlated with the first distance and positively correlated with the wakeup energy value of the respective electronic device and an attenuation coefficient, and wherein the attenuation coefficient represents a correspondence between sound energy and distance from a point source;
- evaluating an energy attenuation based on the attenuation mapping value, the first distance and the wakeup energy value; and
- generating, when the sound source is not the first electronic device, a wakeup forbidding instruction, wherein the energy attenuation of the wakeup word does not comply with an attenuation law of sound energy radiated by the point source.

17. The method according to claim 16, wherein the method further comprises:
- determining whether the first distance is less than a distance threshold; and
- determining, when the first distance is less than the distance threshold, that the sound source is the first electronic device.

18. The method according to claim 16, wherein the method further comprises determining that the sound source is the first electronic device when the first voice wakeup message comprises an identifier, that indicates that the wakeup word is from the first electronic device.

19. The method according to claim 16, wherein the first electronic device is one of a plurality of electronic devices, and wherein the method further comprises:
- receiving distances and wakeup energy values in a plurality of voice wakeup messages from the plurality of electronic devices;
- determining, when the sound source is not the first electronic device, and based on the distances and the wakeup energy values, whether an energy attenuation of the wakeup word complies with an attenuation law of sound energy radiated by a point source; and
- sending, when determining that the energy attenuation of the wakeup word does not comply with the attenuation law, a second wakeup forbidding instruction to the plurality of electronic devices.

20. The method according to claim 16, wherein the first electronic device is a same group of electronic devices managed by a same account.

* * * * *